United States Patent
Huang et al.

(10) Patent No.: US 10,984,376 B2
(45) Date of Patent: Apr. 20, 2021

(54) STORAGE DEVICE AND STORAGE METHOD TO IDENTIFY OBJECT USING SENSING DATA AND IDENTIFICATION MODEL

(71) Applicant: Industrial Technology Research Institute, Hsinchu (TW)

(72) Inventors: Hsin-Chien Huang, Tainan (TW); Wen Tsui, Hsinchu County (TW); Chu-An Chung, Hsinchu County (TW); Chun-Chia Lai, Tainan (TW); Po-Yuan Hsiao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 56 days.

(21) Appl. No.: 16/178,604

(22) Filed: Nov. 2, 2018

(65) Prior Publication Data

US 2020/0076893 A1 Mar. 5, 2020

(30) Foreign Application Priority Data

Aug. 31, 2018 (TW) .................................. 107130534

(51) Int. Cl.
*G06Q 10/08* (2012.01)
*H04L 12/24* (2006.01)
*H04L 29/08* (2006.01)

(52) U.S. Cl.
CPC .......... *G06Q 10/087* (2013.01); *G06Q 10/08* (2013.01); *H04L 41/08* (2013.01); *H04L 41/084* (2013.01);

(Continued)

(58) Field of Classification Search
CPC ... H04L 29/00; H04L 29/06; H04L 29/06544; H04L 41/00; H04L 41/06; H04L 41/0631; H04L 41/065; H04L 41/08–0806; H04L 41/084–0846; H04L 67/00; H04L 67/02; H04L 67/025; H04L 67/1095; H04L 67/1097; H04L 67/12; H04L 67/125;
(Continued)

(56) References Cited

U.S. PATENT DOCUMENTS

| 4,819,015 A * | 4/1989 | Bullivant | ............. | G07G 1/0054 340/568.8 |
| 6,378,684 B1 * | 4/2002 | Cox | ...................... | G07F 7/0636 194/213 |

(Continued)

FOREIGN PATENT DOCUMENTS

| CN | 102426682 | 4/2012 |
| CN | 102923430 | 2/2013 |

(Continued)

OTHER PUBLICATIONS

Andreopoulos, "50 Years of Object Recognition: Directions Forward"—Researchgate.net (Abstract) (Year: 2013).*

(Continued)

*Primary Examiner* — Boris D Grijalva Lobos
(74) *Attorney, Agent, or Firm* — JCIPRNET (57) ABSTRACT

Provided is a storage method including the following. An object is stored in a storage space. The object is sensed to generate sensing data. An identification model is generated according to the sensing data. In addition, the identification model is uploaded to a server.

16 Claims, 3 Drawing Sheets

50

(52) U.S. Cl.
CPC ...... *H04L 41/0806* (2013.01); *H04L 41/0846* (2013.01); *H04L 67/1097* (2013.01); *H04L 67/12* (2013.01); *H04L 67/22* (2013.01)

(58) Field of Classification Search
CPC ........ H04L 67/22; G06Q 10/00; G06Q 10/08; G06Q 10/087; G06Q 10/0875
See application file for complete search history.

(56) References Cited

U.S. PATENT DOCUMENTS

| | | | |
|---|---|---|---|
| 6,677,942 B1* | 1/2004 | Rushmeier | G06T 17/20 |
| | | | 345/420 |
| 6,975,346 B2* | 12/2005 | Kumhyr | G06K 9/00288 |
| | | | 348/143 |
| 7,382,244 B1* | 6/2008 | Donovan | G08B 13/19645 |
| | | | 340/506 |
| 7,483,573 B2 | 1/2009 | Lohweg | |
| 7,780,081 B1* | 8/2010 | Liang | G06Q 30/0633 |
| | | | 235/383 |
| 7,994,914 B2* | 8/2011 | Irmscher | A47F 7/024 |
| | | | 340/531 |
| 8,077,041 B2 | 12/2011 | Stern et al. | |
| 9,129,250 B1* | 9/2015 | Sestini | G06Q 10/087 |
| 9,174,800 B1* | 11/2015 | Curlander | G06K 9/00 |
| 9,412,099 B1* | 8/2016 | Tyree | A47F 9/04 |
| 9,495,682 B2* | 11/2016 | Vallier | G06Q 30/02 |
| 9,659,236 B2* | 5/2017 | Barker | G06K 9/6259 |
| 9,727,838 B2* | 8/2017 | Campbell | G06Q 10/087 |
| 9,784,497 B2 | 10/2017 | Wang et al. | |
| 9,881,276 B2 | 1/2018 | Cohn | |
| 9,881,277 B2 | 1/2018 | Brady | |
| 9,892,438 B1* | 2/2018 | Kundu | G06Q 30/0609 |
| 9,892,606 B2* | 2/2018 | Venetianer | G06K 9/00771 |
| 9,996,818 B1* | 6/2018 | Ren | G06F 16/5866 |
| 10,198,710 B1* | 2/2019 | Hahn | G06Q 10/087 |
| 10,242,393 B1* | 3/2019 | Kumar | G06Q 30/0633 |
| 10,271,666 B2* | 4/2019 | Taylor | A47F 1/125 |
| 10,296,814 B1* | 5/2019 | Kumar | G06K 9/6202 |
| 10,339,595 B2* | 7/2019 | Glaser | G06Q 30/0643 |
| 10,366,306 B1* | 7/2019 | Raghavan | G06K 9/00771 |
| 10,438,164 B1* | 10/2019 | Xiong | G06K 9/6269 |
| 10,475,185 B1* | 11/2019 | Raghavan | G06T 7/0042 |
| 10,657,411 B1* | 5/2020 | Manyam | G06K 9/6215 |
| 2003/0222762 A1* | 12/2003 | Beigl | G06Q 10/087 |
| | | | 340/5.92 |
| 2004/0223054 A1* | 11/2004 | Rotholtz | G08B 13/19613 |
| | | | 348/143 |
| 2005/0131578 A1* | 6/2005 | Weaver | G01G 19/4144 |
| | | | 700/244 |
| 2005/0154515 A1 | 7/2005 | Wallace | |
| 2005/0251367 A1* | 11/2005 | Kahn | G01N 33/18 |
| | | | 702/188 |
| 2006/0175401 A1* | 8/2006 | Roberts | G07F 7/12 |
| | | | 235/383 |
| 2006/0178953 A1* | 8/2006 | Aggarwal | G06Q 10/063 |
| | | | 705/28 |
| 2007/0152047 A1* | 7/2007 | Tu | G06Q 10/087 |
| | | | 235/385 |
| 2008/0221943 A1* | 9/2008 | Porter | G06Q 10/063 |
| | | | 705/7.11 |
| 2009/0045955 A1* | 2/2009 | Ulrich | G06Q 20/208 |
| | | | 340/572.1 |
| 2009/0160646 A1* | 6/2009 | Mackenzie | G06Q 10/08 |
| | | | 340/572.1 |
| 2009/0322529 A1* | 12/2009 | Kangas | G08B 13/2417 |
| | | | 340/572.1 |
| 2010/0012722 A1* | 1/2010 | Hall | G06Q 10/08 |
| | | | 235/385 |
| 2011/0153614 A1* | 6/2011 | Solomon | B65G 1/127 |
| | | | 707/740 |
| 2011/0241831 A1* | 10/2011 | Makiranta | G06Q 10/06 |
| | | | 340/5.92 |
| 2013/0268316 A1* | 10/2013 | Moock | G06Q 30/0201 |
| | | | 705/7.29 |
| 2014/0172555 A1* | 6/2014 | Argue | G06Q 30/0633 |
| | | | 705/14.49 |
| 2015/0012396 A1* | 1/2015 | Puerini | G06Q 10/0875 |
| | | | 705/28 |
| 2015/0137985 A1* | 5/2015 | Zafiroglu | B60R 16/02 |
| | | | 340/686.1 |
| 2015/0310601 A1* | 10/2015 | Rodriguez | G06K 9/209 |
| | | | 348/150 |
| 2016/0371631 A1* | 12/2016 | Jetcheva | G06Q 10/087 |
| 2017/0161675 A1 | 6/2017 | Jones et al. | |
| 2017/0193438 A1* | 7/2017 | Jones | G06K 7/10366 |
| 2017/0205501 A1* | 7/2017 | Liu | G01S 13/931 |
| 2017/0286901 A1* | 10/2017 | Skaff | G06N 3/0454 |
| 2017/0352240 A1* | 12/2017 | Carlton-Foss | A61B 5/1117 |
| 2018/0107999 A1* | 4/2018 | Rizzolo | G06Q 20/201 |
| 2018/0184232 A1* | 6/2018 | Maitra | H04W 4/70 |
| 2018/0232796 A1* | 8/2018 | Glaser | G06Q 90/20 |
| 2019/0012686 A1* | 1/2019 | Lawrenson | G06K 9/00791 |
| 2019/0030712 A1* | 1/2019 | Sciog | B25J 9/163 |
| 2019/0139057 A1* | 5/2019 | Kwak | G01P 15/003 |
| 2019/0244161 A1* | 8/2019 | Abhishek | G06K 19/0723 |
| 2019/0287056 A1* | 9/2019 | Jones | G06K 7/10366 |
| 2020/0014761 A1* | 1/2020 | Kawaai | H04L 67/12 |
| 2020/0043192 A1* | 2/2020 | Zhang | G06K 9/4609 |
| 2020/0050901 A1* | 2/2020 | Kirchner | G08B 21/02 |
| 2020/0074485 A1* | 3/2020 | Popescu | G06Q 30/0202 |

FOREIGN PATENT DOCUMENTS

| | | |
|---|---|---|
| CN | 103761631 | 4/2014 |
| CN | 103903117 | 7/2014 |
| CN | 104616364 | 5/2015 |
| CN | 105046625 | 11/2015 |
| CN | 105129308 | 12/2015 |
| CN | 106408383 | 2/2017 |
| CN | 106447428 | 2/2017 |
| CN | 106504435 | 3/2017 |
| CN | 206178972 | 5/2017 |
| CN | 206741598 | 12/2017 |
| CN | 107657578 | 2/2018 |
| CN | 107730183 | 2/2018 |
| JP | WO2018173121 | * 3/2017 |
| KR | 101493589 | 2/2015 |
| TW | 589275 | 6/2004 |
| TW | I317718 | 12/2009 |
| TW | 201349137 | 12/2013 |
| TW | 201433992 | 9/2014 |
| TW | I457834 | 10/2014 |
| TW | I496096 | 8/2015 |
| TW | I567730 | 1/2017 |
| TW | 201709127 | 3/2017 |
| TW | M548254 | 9/2017 |
| TW | I607383 | 12/2017 |
| TW | I618916 | 3/2018 |

OTHER PUBLICATIONS

"Office Action of Taiwan Counterpart Application," dated Jun. 19, 2019, p. 1-p. 6.

"Office Action of Taiwan Counterpart Application," dated Apr. 16, 2019, p. 1-p. 5.

* cited by examiner

STORAGE DEVICE AND STORAGE METHOD TO IDENTIFY OBJECT USING SENSING DATA AND IDENTIFICATION MODEL

CROSS-REFERENCE TO RELATED APPLICATION

This application claims the priority benefit of Taiwan application serial no. 107130534, filed on Aug. 31, 2018. The entirety of the above-mentioned patent application is hereby incorporated by reference herein and made a part of this specification.

TECHNICAL FIELD

The disclosure relates to a storage device and a storage method.

BACKGROUND

To save the costs of manpower, techniques relating to unmanned stores (or unmanned warehouses) are now under development. Among others, radio frequency identification (RFID) technologies stand as a solution for tracking the status of goods. By arranging RFID tags on the goods, when the user takes away an object from the unmanned store, the sensor in the unmanned store may identify that the object (goods) has been taken away by identifying the RFID tag. Such arrangement helps determine whether the goods have been sold.

However, not all the goods are provided with RFID tags, and the device for scanning RFID tags is not very popular, either. Therefore, a storage device able to correctly identify the same goods in different environments is required.

SUMMARY

An embodiment of the disclosure provides a storage device. The storage device includes a storage space, a sensor, a processor, and a transceiver. The storage space stores an object. The sensor senses the object to generate sensing data. The processor is coupled to the transceiver and the sensor, and is configured to generate an identification model according to the sensing data. The transceiver uploads the identification model to a server.

An embodiment of the disclosure provides a storage device. The storage device includes a storage space, a sensor, a transceiver and a processor. The storage space stores an object. The transceiver downloads an identification model from a server. The sensor senses the object to generate sensing data. The processor is coupled to the transceiver and the sensor, and identifies the object according to the sensing data and the identification model.

An embodiment of the disclosure provides a storage method. The method includes the following. An object is stored in a storage space. The object is sensed to generate sensing data. An identification model is generated according to the sensing data. In addition, the identification model is uploaded to a server.

An embodiment of the disclosure provides a storage method. The method includes the following. An identification model is downloaded from a server. An object is sensed to generate sensing data. In addition, the object is identified according to the sensing data and the identification model.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
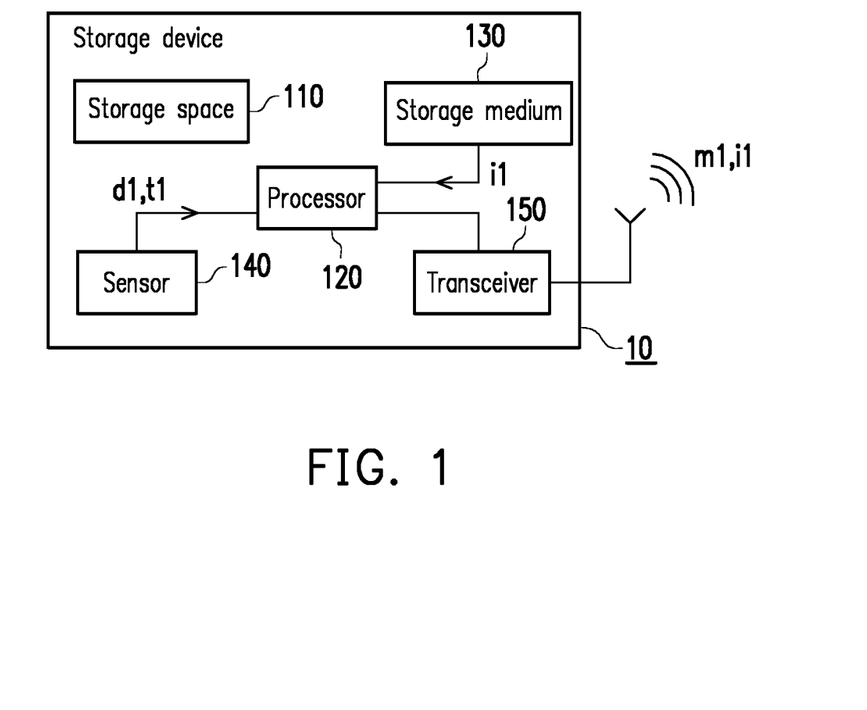
FIG. 1 is a schematic view illustrating a storage device suitable for storing an object and uploading data to a server according to an embodiment of the disclosure.

FIG. 1 is a schematic view illustrating a storage device 10 suitable for storing an object and uploading data to a server according to an embodiment of the disclosure. The storage device 10 may generate an identification model for identifying the object based on the stored object. Thus, when the user moves an object from the storage device 10 to a device at a different location, the identification model generated by the storage device 10 may assist the device at the different location to identify the object and facilitate the speed or accuracy of identifying the object. Based on the above, the storage device 10 may be applied to a scenario such as an unmanned warehouse or an unmanned store. However, the disclosure is not limited thereto.

The storage device 10 may include a storage space 110, a processor 120, a storage medium 130, a sensor 140, and a transceiver 150.

The storage space 110 serves to store one or more objects. Based on the type of the storage device 10, the storage space 110 may have various different configurations. For example, the storage space 110 may be a locker, a freezer, an iron stand, or a shelf, etc. However, the disclosure is not limited thereto.

The processor 120 is coupled to the storage medium 130, the sensor 140, and the transceiver 150. The processor 120 may access or execute data stored in the storage medium 130 as needed. The data include, for example, program codes, device configurations, codebooks, buffered or permanent data. The processor 120 may be, for example, a central processing unit (CPU), or other programmable general purpose or special purpose microprocessors, digital signal processors (DSP), programmable controllers, application specific integrated circuits (ASIC), other similar devices or a combination thereof. However, the disclosure is not limited thereto. Alternatively, the processor 120 and/or the storage medium 130 may also be realized by a server, a client terminal, a desktop computer, a notebook computer, a network computer, a workstation, a personal digital assistant (PDA), a personal computer (PC), etc. The disclosure is not limited thereto.

The storage medium 130 is coupled to the processor 120 and configured to store various software, data, and program codes required during operation of the storage device 10. The storage medium 130 may be, for example, any static or mobile random access memory (RAM), read only memory (ROM), flash memory, hard disk drive (HDD), solid state drive (SSD), similar devices, or a combination thereof. However, the disclosure is not limited thereto. The storage medium 130 may record information i1 of the object stored in the storage space 110. The information i1 may include at least one of identity information, object name, and object number. However, the disclosure is not limited thereto. For example, when the user defines that the storage space 110 serves to store an object A, the storage medium 130 may record information such as the name of the object A, the number of the object A (e.g., the item number of the object A), etc.

The sensor 140 may be, for example, an image capture device (e.g., a camera, a video camera, a handheld phone, etc.), an optical sensing device, an infrared sensing device, an ultrasonic sensing device, a sound receiver, a pressure gauge, or a load cell. However, the disclosure is not limited thereto.

The transceiver 150 serves to receive or transmit signals, and is compatible with a wireless fidelity (WiFi) communication interface, a Bluetooth communication interface, a ZigBee communication interface, a local area network (LAN), a universal serial bus (USB) interface, and/or other types of communication interfaces. However, the disclosure is not limited thereto.

Figure 2:
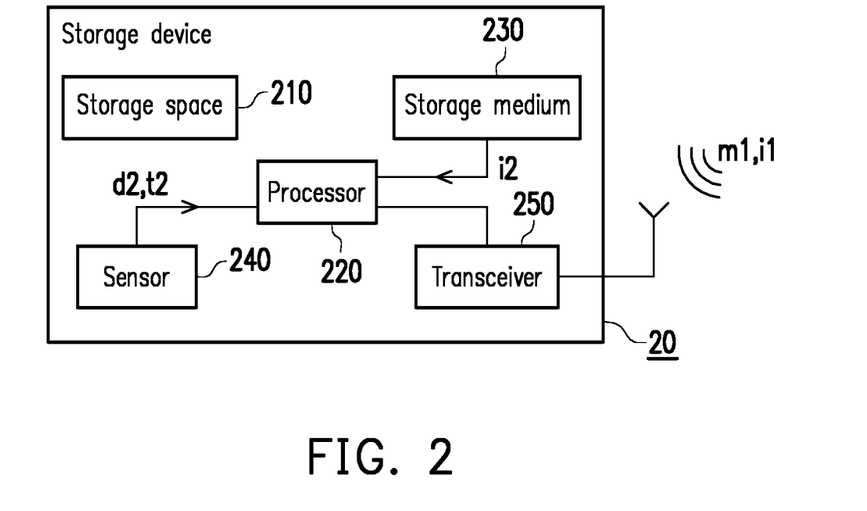
FIG. 2 is a schematic view illustrating a storage device suitable for storing an object and downloading data from a server according to an embodiment of the disclosure.

FIG. 2 is a schematic view illustrating a storage device 20 suitable for storing an object and downloading data from a server according to an embodiment of the disclosure. When the user places an object into the storage device 20, the storage device 20 may identify the object. The storage device 20 may also download an identification model (e.g., one generated from the storage device 10 as shown in FIG. 1) associated with the object from a server (e.g., a cloud server or a server associated with the storage device 10, but the disclosure is not limited thereto). In this way, the speed or accuracy of the storage device 20 in identifying the object may be facilitated through the assistance of the identification model.

The storage device 20 may include a storage space 210, a processor 220, a storage medium 230, a sensor 240, and a transceiver 250.

The storage space 210 serves to store one or more objects. Based on the type of the storage device 20, the storage space 210 may have various different configurations. For example, the storage space 210 may be a locker, a freezer, an iron stand, or a shelf, etc. However, the disclosure is not limited thereto.

The processor 220 is coupled to the storage medium 230, the sensor 240, and the transceiver 250. The processor 220 may access or execute data stored in the storage medium 230 as needed. The data include, for example, program codes, device configurations, codebooks, buffered or permanent data. The processor 220 may be, for example, a central processing unit (CPU), or other programmable general purpose or special purpose microprocessors, digital signal processors (DSP), programmable controllers, application specific integrated circuits (ASIC), other similar devices or a combination thereof. However, the disclosure is not limited thereto.

The storage medium 230 is coupled to the processor 220 and configured to store various software, data, and program codes required during operation of the storage device 20. The storage medium 230 may be, for example, any static or mobile random access memory (RAM), read only memory (ROM), flash memory, hard disk drive (HDD), solid state drive (SSD), similar devices, or a combination thereof. However, the disclosure is not limited thereto. The storage medium 230 may record information i2 of the object stored in the storage space 210. The information i2 may include at least one of identity information, object name, and object number. However, the disclosure is not limited thereto. For example, when the user defines that the storage space 210 serves to store the object A, the storage medium 230 may record information such as the name of the object A, the number of the object A (e.g., the item number of the object A), etc. Meanwhile, identity information corresponding to a user may serve to associate the user to the storage device 20.

The sensor 240 may be, for example, an image capture device (e.g., a camera, a video camera, a handheld phone, etc.), an optical sensing device, an infrared sensing device, an ultrasonic sensing device, a sound receiver, a pressure gauge, or a load cell. However, the disclosure is not limited thereto.

The transceiver 250 serves to receive or transmit signals, and is compatible with a wireless fidelity (WiFi) communication interface, a Bluetooth communication interface, a ZigBee communication interface, a local area network (LAN), a universal serial bus (USB) interface, and/or other types of communication interfaces. However, the disclosure is not limited thereto.

In this embodiment, the storage device 10 may store an object and establish an identification model associated with the object. When the user moves the object stored in the storage device 10 to the storage device 20, the identification model of the object generated by the storage device 10 may assist the storage device 20 in identifying the object, thereby facilitating the speed and accuracy of the storage device 20 in identifying the object.

Referring to FIG. 1, specifically, the storage space 110 may serve to store an object. The sensor 140 may sense the storage space 110 or the object stored in the storage space 110 to generate sensing data d1. For example, if the sensor 140 is an image capture device, the sensor 140 may sense the object in the storage space 110 to generate, for example, the sensing data d1 including the image of appearance of the object or the location information of the object. The location information may be, for example, coordinates at which the object is placed in the storage space 110. However, the disclosure is not limited thereto. Alternatively, if the sensor 140 is a load cell, the sensor 140 may sense the storage space 110 to generate load data for the object in the storage space 110.

After the sensing data d1 is generated, the processor 120 may be configured to generate an identification model m1 according to the sensing data d1. The identification model m1 is associated with the object stored in the storage space 110 and may assist other devices (e.g., the storage device 20 shown in FIG. 2) in identifying the object stored in the storage space 110.

After the identification model m1 is generated, the transceiver 150 may upload the identification model m1 to a server (e.g., a cloud server or a server associated with the storage device 10, but the disclosure is not limited thereto). Thus, when the storage device 20 needs to identify the object from the storage device 10, the storage device 20 may download the identification model m1 from the server, thereby facilitating the speed or accuracy of identification through the assistance of the identification model m1.

In some embodiments, the sensor 140 may generate a trigger signal t1 in response to the object in the storage space 110 being removed from the storage space 110, and the processor 120 may upload the information i1 of the object to the server in response to the trigger signal t1. The information i1 may correspond to the storage device 20. Taking the scenario where the storage device 10 is associated with the storage device 20 as an example, it is assumed that the object taken out from the storage device 10 may be moved to the storage device 20 (e.g., the storage device 10 and the storage device 20 belong to the same or associated storage systems). When the sensor 140 senses that the user takes an object from the storage device 10 and thus generates the trigger signal t1, the processor 120 may upload the information i1 of the object to the server to which the storage device 20 is accessible through the transceiver 150. In this way, when the user moves the object from the storage device 10 to the storage device 20, the storage device 20 may download the information i1 corresponding to the object from the server.

In addition, the information i1 may correspond to the user who results in generation of the trigger signal t1, such as the owner of the storage device 20. Taking the situation where the storage device 10 is disposed in an unmanned store and the storage device 20 belongs to a user as an example, it is assumed herein that when the user of the storage device 20 enters the unmanned store, the unmanned store may obtain the identity of the user by using an arbitrary known technique (e.g., a technique such as radio frequency identification (RFID), human face recognition, etc.) and notify the storage device 10 of the identity of the user. Then, when the sensor 140 senses that the user takes an object from the storage device 10 and thus generates the trigger signal t1, the processor 120 may upload the information i1 of the object to the server to which the storage device 20 is accessible through the transceiver 150 (i.e., the trigger signal t1 may correspond to the user of the storage device 20). In this way, when the user moves the object from the storage device 10 to the storage device 20, the storage device 20 may download the information i1 corresponding to the object from the server. In an embodiment, the information i1 may include the identity information of the user. The processor 120 uploads the information i1 of the object to a server through the transceiver 150. The server may transmit the information i1 to the storage device 20 corresponding to the identity information according to the identity information, or grant the storage device 20 the access to the information i1.

Compared with identifying the object by using the identification model M1 only, using the identification model m1 and the information i1 of the object together may further facilitate the identification speed or accuracy. Specifically, when a device identifies the object by using the identification model m1, the information i1 of the object may serve to narrow down the number of possible types of the object. For example, when the identification model m1 is associated with thousands of objects, the device (e.g., the storage device 20) that identifies the object by using the identification model m1 needs to determine the category of the object based on thousands of possible categories of objects. Therefore, the computation load is high. However, when one or more objects are removed from the storage device 10, the information i1 of the object is only associated with the one or more objects. Therefore, the device (e.g., the storage device 20) that identifies the object by using the identification model m1 and the information i1 of the object may serve to narrow down the possible categories of the object to the one or more objects, thereby alleviating the computation load.

Referring to FIG. 2, the storage space 210 may serve to store an object. The processor 220 may download the identification model m1 from a server (e.g., a cloud server or a server associated with the storage device 10, but the disclosure is not limited thereto) through the transceiver 250. In some embodiments, the storage device 20 may obtain the identification model m1 indirectly. For example, a mobile device may download the identification model m1 from the server, and then transmit the identification model m1 to the storage device 20.

The sensor 240 may sense the storage space 210 or the object stored in the storage space 210 to generate sensing data d2. For example, if the sensor 240 is an image capture device, the sensor 240 may sense the object in the storage space 210 to generate, for example, the sensing data d2 including the image of the appearance of the object or the location information of the object. The location information may be, for example, coordinates at which the object is placed in the storage space 210. However, the disclosure is not limited thereto. Alternatively, if the sensor 240 is a load cell, the sensor 240 may sense the storage space 210 to generate load data for the object in the storage space 210.

After the sensing data d2 is generated, the processor 220 may be configured to identify the object stored in the storage space 210 according to the sensing data d2 and the identification model m1.

In some embodiments, the sensor 240 may generate a trigger signal t2 in response to the object being placed into the storage space 210, and the processor 220 may download the information of the object through the transceiver 250 in response to the trigger signal t2. The information may be, for example, the information i1 generated from storage device 10.

After the information i1 is obtained, the processor 220 may compare the information i1 with the information i2 of the object stored in the storage space 210, so as to generate a limiting condition for identifying the object according to the sensing data d2 and the identification model m1. Specifically, the processor 220 may determine a possible category of the object in the storage space 210 based on the object corresponding to the information i1 conforming to the object corresponding to the information i2.

In some embodiments, the environment from which the identification model m1 is generated may be different from the storage space 210. For example, the configuration of the storage space 110 of the storage device 10 from which the identification model m1 is generated may be different from the configuration of the storage space 210, or the configuration of the type and number of the sensor 140 may be different from the configuration of the type and number of the sensor 240. As such, it may be difficult for the processor 220 of the storage device 20 to identify the object in the storage space 210 directly according to the identification model m1 and the sensing data d2. In this case, the process in which the processor 220 is configured to identify the object stored in the storage space 210 according to the sensing data d2 and the identification model m1 may include that the processor 220 generates an identification model m2 according to the sensing data d2, and that the processor 220 identifies the object in the storage space 210 according to the identification model m1 and the identification model m2.

Figure 3A:
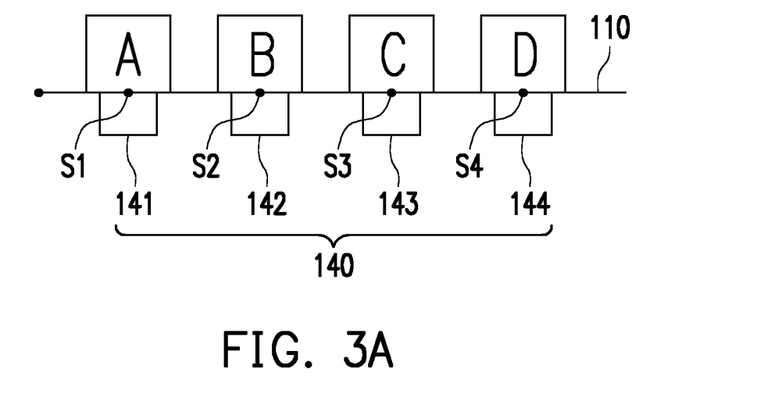
FIGS. 3A and 3B are schematic views illustrating identifying an object based on an identification model and information of an object according to an embodiment of the disclosure.
Figure 3B:
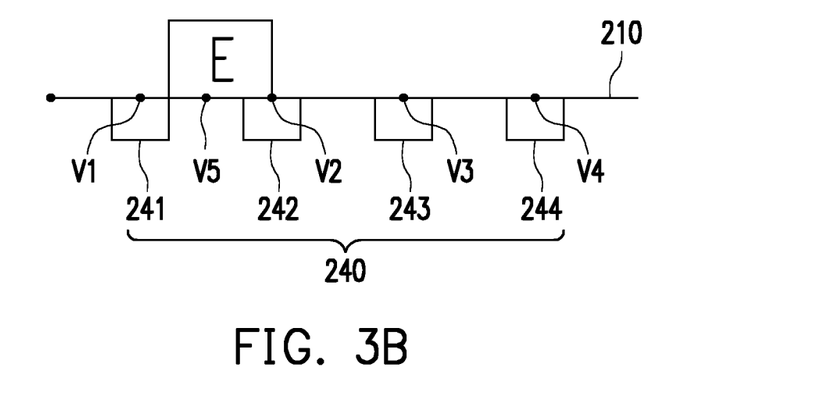

Referring to FIGS. 3A and 3B, FIGS. 3A and 3B are schematic views illustrating that the storage device 20 identifies an object E from the storage device 10 based on the identification model m1 and the information i1 of the object according to an embodiment of the disclosure. The sensor 140 includes load cells 141, 142, 143, and 144, and the sensor 240 includes load cells 241, 242, 243, and 244.

In this embodiment, the storage space 110 of the storage device 10 has a total of four locations for placing objects, including a location S1, a location S2, a location S3, and a location S4, where an object A, an object B, an object C, and an object D are respectively placed. When the object A is removed from the storage space 110, the processor 120 may record changes in readings of the load cells 141, 142, 143, and 144 (i.e., sensing data associated with the object A).

After the above steps are sequentially performed on the object A, the object B, the object C, and the object D, the processor 120 obtains the sensing data d1 associated with the object A, the object B, the object C, and the object D, and generates the identification model m1 according to the sensing data d1. The identification model m1 includes data as shown in Table 1:

TABLE 1

| Object | Location | Reading of the load cell 141 | Reading of the load cell 142 | Reading of the load cell 143 | Reading of the load cell 144 | Total amount of changes in readings |
|---|---|---|---|---|---|---|
| Object A | S1 | 149.9683 | 111.87 | 11.52 | 33.94 | 307.30 |
| Object B | S2 | 65.78 | 56.82 | 32.98 | 57.95 | 213.53 |
| Object C | S3 | 21.82 | 21.87 | 25.14 | 46.79 | 115.62 |
| Object D | S4 | 5.65 | 12.19 | 17.70 | 36.1 | 71.64 |

Meanwhile, the storage space 210 of the storage device 20 has a total of four locations for placing objects, including a location V1, a location V2, a location V3, and a location V4. It is assumed that the configuration of the storage device 20 is the same as that of the storage device 10 (i.e., the location S1, the location S2, the location S3, and the location S4 are respectively configured in the same way as the location V1, the location V2, the location V3, and the location V4, and the sensor 140 is configured in the same way as the sensor 240). The user may place a weight of 100 grams at any location in the storage space 210, and record the location where the weight is placed and the readings of the respective load cells (i.e., the load cells 241, 242, 243, and 244), thereby establishing a regression model for predicting the readings of the respective load cells when an object is present in the storage device 210, such as one shown in Formula (1):

$$y_j^i = r\vec{a}_j^{iT} \vec{w},$$ Formula (1)

wherein i is the index of the load cell, j is the index of the location where the weight is placed, $y_j^i$ is the reading of the $i^{th}$ load cell when the weight is placed at the location j, r is the total amount of changes of the load cells divided by 100, and $\vec{a}_j^i$ is a vector between the load cell i and the position j. After the regression model is established (i.e., $\vec{w}$ is derived through the training process), the readings of the respective load cells ($y_j^i$) can be predicted by inputting the total amount of changes of the load cells (r as the total amount of changes of the load cells divided by 100) and the location of the goods ($\vec{a}_j^i$ as the vector between the load cell i and the location j).

When the user takes the object C and the object D from the storage space 110 of the storage device 10, the processor 120 may upload the information i1 associated with the object C and the object D to a server. When the user moves the object E into the storage space 210, the processor 220 may download the identification model m1 (i.e., Table 1) and the information i1 from the server, and determine according to the information i1 (e.g., the object names of the object C and the object D) that the object E may be one of the object C and the object D. In addition, the processor 220 may record the changes in readings of the load cells 241, 242, 243, 244 and the total amount of the changes in readings of the load cells when the object E is moved in (i.e., the sensing data d2 associated with the object E). The sensing data d2 is associated with the location V5 of the object E in the storage space 210 and includes the data as shown in Table 2:

TABLE 2

| Object | Location | Reading of the load cell 241 | Reading of the load cell 242 | Reading of the load cell 243 | Reading of the load cell 244 | Total amount of changes in readings |
|---|---|---|---|---|---|---|
| Object E | V5 | 22.45 | 14.63 | 18.38 | 18.49 | 73.94 |

The processor 220 may generate the identification model m2 as shown in Table 3 based on the regression model of Formula (1) and the sensing data d2 (i.e., Table 2). With the identification model m2, the readings of the respective load cells (i.e., the load cells 241, 242, 243, and 244) when the object E is placed at the location V3 or the position V4 can be estimated.

TABLE 3

| Object | Location | Reading of the load cell 241 | Reading of the load cell 242 | Reading of the load cell 243 | Reading of the load cell 244 | Total amount of changes in readings |
|---|---|---|---|---|---|---|
| Object E | V3 | 15.24 | 10.17 | 22.85 | 25.56 | 73.81 |
| Object E | V4 | 8.46 | 5.97 | 27.05 | 32.21 | 73.69 |

Then, the processor 220 may calculate a square error (hereinafter referred to as "square error A") of the readings of the load cells when the object C is placed at the location S3 and the readings of the load cells when the object E is placed at the location V3 and calculate a square error (hereinafter referred to as "square error B") of the readings of the load cells when the object D is placed at the location S4 and the readings of the load cells when the object E is placed at the location V4 according to the identification model m1 (i.e., Table 1) and the identification model m2

(i.e., Table 3). The processor 220 may determine the category of the object E based on the size of the square errors. If the square error A is less than the square error B, the processor 220 may identify the object E as the object C. Alternatively, if the square error A is greater than the square error B, the processor 220 may identify the object E as the object D.

Figure 4:
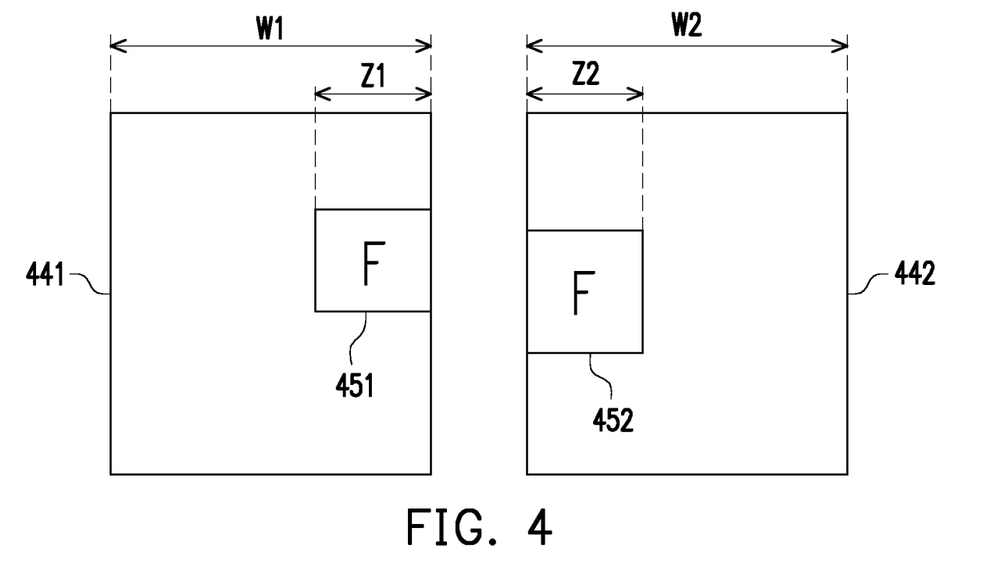
FIG. 4 is a schematic view illustrating identifying an object based on an identification model according to an embodiment of the disclosure.

FIG. 4 is a schematic view illustrating that the storage device 20 identifies an object F from the storage device 10 based on the identification model m2 according to an embodiment of the disclosure. In this embodiment, it is assumed that the sensor 240 of the storage device 20 includes two image capture devices which respectively generate an image 441 and an image 442. The image 441 captures a first portion 451 of the object F, and the image 442 captures a second portion 452 of the object F. After the storage device 20 obtains the identification model m1 generated from the storage device 10, since none of the first portion 451 of the object F captured in the image 441 and the second portion 452 of the object F captured in the image 442 covers the complete object F, there is necessarily a difference between the feature of the object F captured from the first portion 451 of the object F captured in the image 441 or the second portion 452 of the object F captured in the image 442 and the identification model m1 generated from the identification device 10. In order to reduce the error rate for identifying the object F, the first portion 451 of the object F captured in the image 441 and the second portion 452 of the object F captured in the image 442 may be combined (i.e., the sensing data d2) to generate the identification model m2, such as one shown in Formula (2):

$$A = A1*(Z1/W1) + A2*(Z2/W2) \quad \text{Formula (2),}$$

wherein A is an image obtained by combining the first portion 451 of the object F captured in the image 441 and the second portion 452 of the object F captured in the image 442, A1 is the first portion 451, A2 is the second portion 452, W1 is the width of the image 441, W2 is the width of the image 442, Z1 is the width of the first portion 451, and Z2 is the width of the second portion 452. After feature capturing, the image A obtained from Formula (2) is compared with the identification model m1 generated from the storage device 10, and the closest object is the category of the object F.

Figure 5:
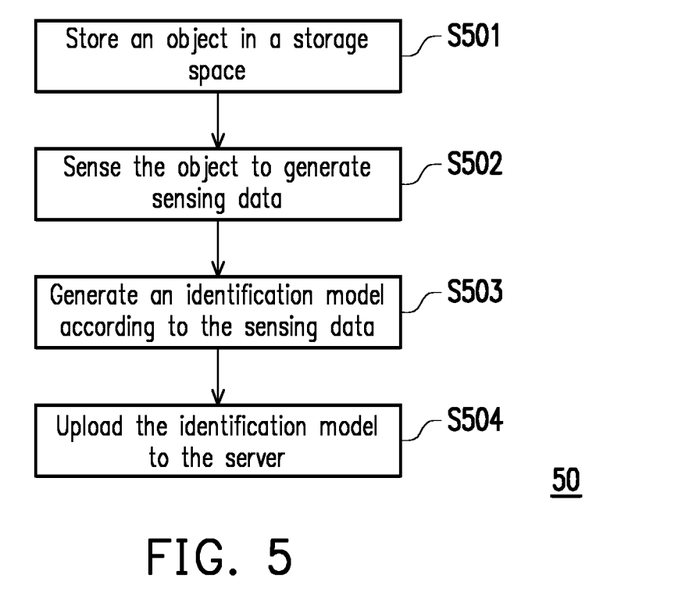
FIG. 5 is a flowchart illustrating a storage method suitable for storing an object and uploading data to a server according to an embodiment of the disclosure.

FIG. 5 is a flowchart illustrating a storage method 50 suitable for storing an object and uploading data to a server according to an embodiment of the disclosure, and the storage method 50 is suitable for the storage device 10. At Step S501, an object is stored in a storage space. At Step S502, the object is sensed to generate sensing data. At Step S503, an identification model is generated according to the sensing data. At Step S504, the identification model is uploaded to the server.

Figure 6:
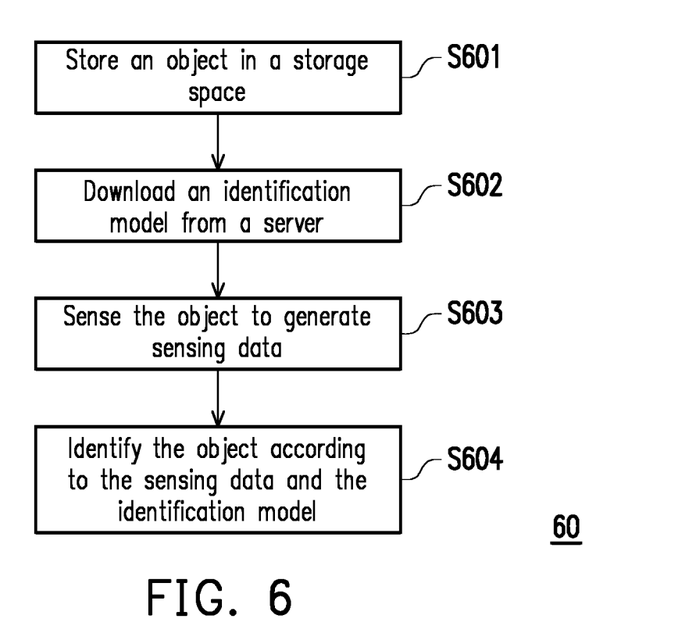
FIG. 6 is a flowchart illustrating a storage method suitable for storing an object and downloading data from a server according to an embodiment of the disclosure.

FIG. 6 is a flowchart illustrating a storage method 60 suitable for storing an object and downloading data from a server according to an embodiment of the disclosure, and the storage method 60 is suitable for the storage device 20. At Step S601, an object is stored in a storage space. At Step S602, an identification model is downloaded from the server. At Step S603, the object is sensed to generate sensing data. At Step S604, the object is identified according to the sensing data and the identification model.

Based on the above, the first storage device according to the embodiments of the disclosure may train the identification model for identifying an object according to the configuration of the storage space of the storage device or the object stored in the storage device, and uploads the identification model to a cloud server. When a user takes away the object in the storage space, the storage device may further upload information related to the object to the cloud server. Then, another device at a different location may obtain the identification model and the information related to the object from the cloud server to identify the object. Meanwhile, the second storage device according to the embodiments of the disclosure may download the identification model and the information related to the object for identifying the object from the cloud server. When the user places the object in the storage space of the storage device, the identification model and the information related to the object can assist the storage device in identifying the object. With the embodiments of the disclosure, even if the device for training the identification model and the storage device have different configurations or are in different environments (e.g., the types of sensors used are different), the storage device is still able to facilitate the speed or accuracy in identifying the object according to the identification model.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A storage device, comprising:
    a storage space comprising a plurality of sub-spaces, suitable for storing an object belonging to a plurality of object categories;
    a sensor, sensing the object to generate sensing data, wherein the sensor comprising a plurality of load cells as each load cell is disposed in each of the plurality of sub-spaces, and the sensing data comprises a change of a total load data corresponding to the object sensed by the plurality of load cells in each of the plurality of sub-spaces by removing or by placing the object into one of the plurality of sub-spaces; and
    a processor, coupled to a transceiver and the sensor, wherein the processor is configured to generate an identification model which comprises a plurality of objects, location information of each of the plurality of objects within each of the plurality of sub-spaces, and a summation of all the changes of readings of the plurality of load cells as each of the plurality of objects is removed from the load cells and is to identify the object category of the plurality of object categories according to the sensing data;
    wherein the transceiver is configured to upload the identification model and the object category of plurality of object categories to a server.

2. The storage device as claimed in claim 1, further comprising:
    a storage medium, coupled to the processor and recording information of the object, wherein:
    the sensor generates a trigger signal in response to the object being removed from the storage space, and
    the processor uploads the information to the server through the transceiver in response to the trigger signal.

3. The storage device as claimed in claim 2, wherein the information corresponds to a user associated with the trigger signal.

4. The storage device as claimed in claim 2, wherein the information comprises at least one of identity information, object name, and object number.

5. A storage device, comprising:
a storage space, having a plurality of sub-spaces, wherein the storage space is suitable for storing an object belonging to a plurality of object categories;
a transceiver, configured to download an identification model from a server and upload an object category of the plurality of object categories to the sever;
a sensor, sensing the object to generate sensing data, wherein the sensor comprising a plurality of load cells as each load cell is disposed in each of the plurality of sub-spaces, and the sensing data comprises a change of a total load data corresponding to the object sensed by the load cells in each of the plurality of sub-spaces by removing or by placing the object into the storage space; and
a processor, coupled to the transceiver and the sensor, wherein the processor is configured to identify the object and the object category of the plurality of object categories according to the sensing data, the identification model, and location information of one of the plurality of sub-spaces which stores the object wherein the identification model comprises a plurality of objects, location information of each of the plurality of objects within each of the plurality of sub-spaces, and a summation of all the changes of readings of the plurality of load cells as each of the plurality of objects is removed from the load cells.

6. The storage device as claimed in claim 5, further comprising:
a storage medium, coupled to the processor and recording second information of the object, wherein:
the sensor generates a trigger signal in response to the object being placed into the storage space,
the processor downloads information of the object through the transceiver in response to the trigger signal; and
the processor compares the information and the second information to generate a limiting condition for identifying the object according to the sensing data and the identification model.

7. The storage device as claimed in claim 5, wherein the processor being configured to identify the object according to the sensing data and the identification model comprises:
generating a second identification model according to the sensing data; and
identifying the object according to the identification model and the second identification model.

8. The storage device as claimed in claim 6, wherein the information and the second information comprise at least one of identify information, object name, and object number.

9. A storage method, comprising:
storing an object in a storage space comprising a plurality of sub-spaces suitable for storing an object belonging to a plurality of object categories;
sensing the object to generate sensing data by using a sensor comprising a plurality of load cells as each load cell is disposed in each of the plurality of sub-spaces, wherein the sensing data comprises a change of a total load data corresponding to the object sensed by the load cells in each of the plurality of sub-spaces by removing or by placing the object into the storage space;
generating an identification model according to the sensing data, wherein the identification model comprises a plurality of objects, location information of each of the plurality of objects within each of the plurality of sub-spaces, and a summation of all the changes of readings of the plurality of load cells as each of the plurality of objects is removed from the load cells;
identifying an object category of the plurality of object categories from the identification model; and
uploading the identification model and the object category of the plurality of object categories to a server.

10. The storage method as claimed in claim 9, further comprising:
recording information of the object;
generating a trigger signal in response to the object being removed from the storage space; and
uploading the information to the server in response to the trigger signal.

11. The storage method as claimed in claim 10, wherein the information corresponds to a user associated with the trigger signal.

12. The storage method as claimed in claim 10, wherein the information comprises at least one of identity information, object name, and object number.

13. A storage method, comprising:
storing an object in a storage space having a plurality of sub-spaces for storing an object belonging to a plurality of object categories;
downloading an identification model from a server;
sensing the object to generate sensing data by using a sensor comprising a plurality of load cells as each load cell is disposed in each of the plurality of sub-spaces, wherein the sensing data comprises a change of a total load data corresponding to the object sensed by the load cells in each of the plurality of sub-spaces by removing or by placing the object into the storage space;
identifying the object and the object category of the plurality of object categories of the object according to the sensing data, the identification model, and location information of one of the plurality of sub-spaces which stores the object, wherein the identification model comprising a plurality of objects, location information of each of the plurality of objects within each of the plurality of sub-spaces, and a summation of all the changes of readings of the plurality of load cells as each of the plurality of objects is removed from the load cells; and
uploading information of the object and the object category of the plurality of object categories to the sever.

14. The storage method as claimed in claim 13, further comprising:
recording second information of the object;
generating a trigger signal in response to the object being placed into the storage space;
downloading information of the object in response to the trigger signal; and
comparing the information and the second information to generate a limiting condition for identifying the object according to the sensing data and the identification model.

15. The storage method as claimed in claim 13, wherein identifying the object according to the sensing data and the identification model comprises:
generating a second identification model according to the sensing data; and
identifying the object according to the identification model and the second identification model.

16. The storage method as claimed in claim 14, wherein the information and the second information comprise at least one of identify information, object name, and object number.

* * * * *